Figure 1:
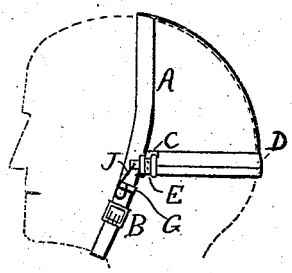

G. M. BRANAMAN.
ELECTRIC HEAD CAP.
APPLICATION FILED APR. 25, 1908.

915,824.  Patented Mar. 23, 1909.

Witnesses
John A Hulit

Inventor
George M. Branaman
By J. A. Rosen
Atty

UNITED STATES PATENT OFFICE.

GEORGE M. BRANAMAN, OF KANSAS CITY, MISSOURI.

ELECTRIC HEAD-CAP.

No. 915,824.      Specification of Letters Patent.      Patented March 23, 1909.

Application filed April 25, 1908. Serial No. 429,130.

*To all whom it may concern:*

Be it known that I, GEORGE M. BRANAMAN, a citizen of the United States, residing at Kansas City, in the county of Jackson and State of Missouri, have invented a new and useful Improvement in Electric Head-Caps, of which the following is a specification.

The object of my invention is to provide an apparatus for utilizing the therapeutic properties of the electric current by application to the part of the human anatomy which I deem most responsive to such treatment, to improve generally upon appliances for electric treatment, to provide a device with ear-bobs forming the terminals for a battery, to provide in such a device a comfortable and efficient head gear for supporting the battery and the ear-bobs, and to provide an adjustable device of that kind.

My invention consists principally of a battery and ear-bobs forming the terminals for the battery.

It further consists of a battery, ear-bobs forming the terminals for the battery, and a head-gear for supporting the battery and the ear-bobs on the head.

It further consists of the parts, improvements, and combinations hereinafter set forth and claimed.

In the drawings accompanying and forming part of this specification, and in the description of the drawings, I have shown my invention in its preferred form, and have shown the best mode of applying the principles thereof. It is to be understood, however, that my invention is not confined to the exact details shown in those drawings and in that description; and that I contemplate changes in form, proportions, materials, and arrangement, the transposition of parts, and the substitution of equivalent members, without departing from the spirit of the invention; within the scope of the appended claims.

Figure 2:
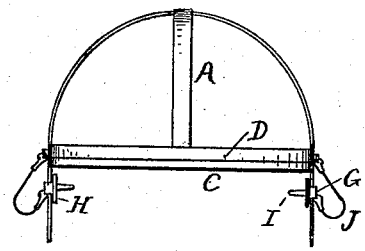
Figure 3:
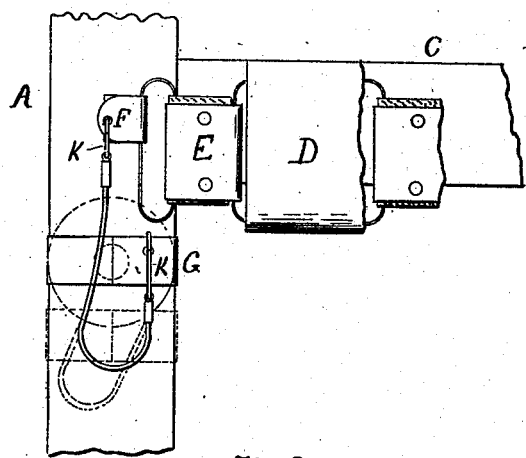
Figure 4:
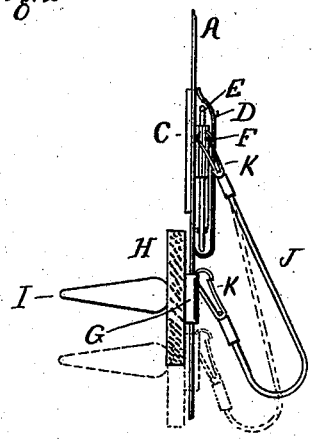

Figure 1 is a side view of an apparatus made in accordance with the principles of my invention. Fig. 2 is a rear view. Figs. 3 and 4 are enlarged details showing the connections between the battery and the ear-bob, and the manner of adjustably mounting the ear-bob on the head-strap.

Similar reference characters indicate like or corresponding parts throughout the several views.

A is a strap or band adapted to encircle the head and provided with a buckle B.

C is a strap extending around the back of the head and secured to the strap A.

D is a moisture-proof sheath, into which may be inserted a suitable battery E, which may be of any suitable type for use in a device of this kind, preferably a "vinegar" battery, which may be energized by the use of vinegar, the battery containing absorbent material for such purpose. The ends of the battery may be fastened to the metal clips or hooks F.

G is a metal band or clip adapted to fit snugly around the strap A, but so as to slide thereon, and on the inside thereof is mounted an ear-bob I, adapted to be inserted into the ear.

H is a felt cushion secured to the inner side of the clip G to rest against the ear.

J is an insulated flexible cord extending between clips F and G, and removably secured thereto by the snaps K, K, respectively.

The apparatus is applied in the following manner: The battery is removed and immersed in vinegar for two or three minutes, or other suitable period; it is then inserted in the sheath D, which being moisture-proof, prevents the moisture from wetting the person, the upper hook K being removed in order to take off the battery and being again snapped on to keep the battery secured to the hook. The apparatus is then put on the head, the ear-bobs being adjusted to fit into the ears. Preferably, in treatment, moist cotton is wrapped around each ear-bob before it is inserted into the ear.

What I claim is:

1. In a device of the kind described, the combination of a strap adapted to encircle the head and provided with a buckle, a strap adapted to pass around the back of the head and secured to the first-mentioned strap, a moisture-proof battery-sheath supported thereon, a battery removably inserted in the sheath, ear-bobs and clips slidably mounted on said first-mentioned strap, a cushion for each ear-bob, and a flexible conducting cord connecting each end of the battery with one of said ear-bobs.

2. In a device of the kind described, the combination of a strap adapted to encircle the head and provided with a buckle, a strap adapted to pass around the back of the head and secured to the first-mentioned strap, a battery, ear-bobs and clips slidably mounted on the said first-mentioned strap, a cushion
5 for each ear-bob, and a flexible conducting cord connecting each end of the battery with one of said ear-bobs.

In testimony whereof I have hereunto set my name in the presence of witnesses.

GEORGE M. BRANAMAN.

Witnesses:
P. M. PERKINS,
S. B. GREENMAN.